United States Patent [19]
Sibecas

[11] Patent Number: 5,966,651
[45] Date of Patent: Oct. 12, 1999

[54] APPARATUS FOR COMMUNICATING A USER CREATED MESSAGE FROM A PORTABLE TRANSCEIVER TO A CALLER

[75] Inventor: Salvado Sibecas, Lake Worth, Fla.

[73] Assignee: Motorola, Inc., Schaumburg, Ill.

[21] Appl. No.: 08/578,115

[22] Filed: Mar. 28, 1996

[51] Int. Cl.⁶ .......................... H04M 11/10; H04M 3/42
[52] U.S. Cl. .................. 455/412; 455/414; 379/88.21; 379/88.19
[58] Field of Search ...................... 455/412, 31.1, 455/31.2, 31.3, 413, 414, 415; 379/67, 88, 89, 127, 142, 245, 246, 247, 249, 88.19, 88.2, 88.21; 340/825.44

[56] References Cited

U.S. PATENT DOCUMENTS

| | | | |
|---|---|---|---|
| 4,875,038 | 10/1989 | Siwiak et al. | 340/825.44 |
| 4,996,704 | 2/1991 | Brunson | 379/88.19 |
| 5,063,588 | 11/1991 | Patsiokas et al. | 455/415 |
| 5,335,246 | 8/1994 | Yokev et al. | 455/31.3 |
| 5,459,458 | 10/1995 | Richardson et al. | 340/825.44 |
| 5,475,739 | 12/1995 | Norimatsu | 455/413 |
| 5,550,900 | 8/1996 | Ensor et al. | 379/67 |
| 5,600,703 | 2/1997 | Dang et al. | 455/31.3 |

*Primary Examiner*—Dwayne D. Bost
*Assistant Examiner*—Tracy M. Legree
*Attorney, Agent, or Firm*—Charles W. Bethards

[57] ABSTRACT

A method and apparatus for communicating a user created message from a portable transceiver (122) to a caller. The user of the portable transceiver (122) creates the user created message and stores it in the memory of the portable transceiver (122). The caller calls a communication terminal (102) and provides information that determines who the called party is, where the user created message retrieved from the called party is to be delivered, and in what format it is to be delivered. The communication terminal (102) sends a query message (400) to the portable transceiver (122) to retrieve the user created message. The portable transceiver (122) in response transmits the user created message to the communication terminal (102). The communication terminal (102) then translates the user created message into a voice message, if requested by the caller, and delivers the message to the caller by way of telephony or a page.

13 Claims, 8 Drawing Sheets

APPARATUS FOR COMMUNICATING A USER CREATED MESSAGE FROM A PORTABLE TRANSCEIVER TO A CALLER

FIELD OF THE INVENTION

This invention relates in general to two-way messaging in a radio communication system, and more specifically to an apparatus for communicating a user created message from a portable transceiver to a caller.

BACKGROUND OF THE INVENTION

A radio communication system with two-way messaging communication between base stations and portable transceivers provides an important means for the base stations to determine the reliability of a message transaction. Two-way communication can be used by a caller accessing the radio communication system to determine that the called party has received the caller's page.

There are times when the called party desires to provide a lengthy message to the caller, such as a business client. For example, a stock broker may have been asked by his client to research a prospective company for investment purposes. Because of his busy schedule, the stock broker may not be available to respond to his client at the clients convenience.

In prior art systems, the called party (such as the stock broker discussed above) typically responds to messages by way of a conventional telephone. However, this approach may be impractical when the called party, for example, is traveling in an automobile and a cellular phone or other suitable communication device is unavailable. And even when a cellular phone is available, communicating lengthy messages may be too costly for the called party.

Thus, what is needed is a method and apparatus for communicating a user created message from a portable transceiver to a caller. In particular, it is desirable to provide the user of the portable transceiver with a convenient and cost effective method and apparatus for creating and storing the user created message corresponding in the portable transceiver for transmission to the caller.

DESCRIPTION OF THE PREFERRED EMBODIMENT

Figure 1:
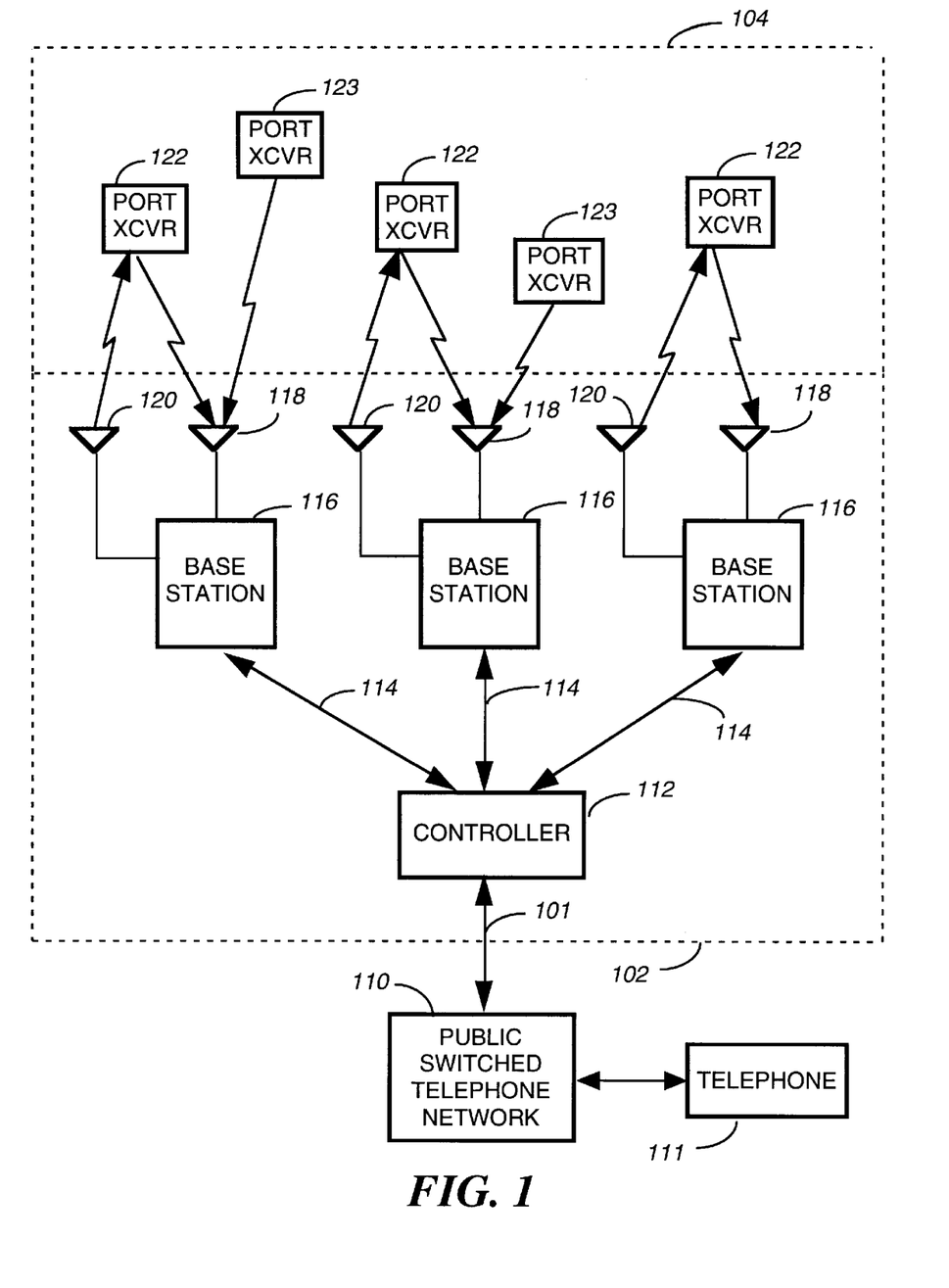
FIG. 1 is an electrical block diagram of a two-way communication system according to the present invention.

FIG. 1 is an electrical block diagram of a two-way messaging communication system according to the present invention. The communication system comprises a communication terminal 102 and a portable portion 104. The communication terminal 102 includes a plurality of base stations 116, for communicating with the portable portion 104 via conventional radio frequency (RF) techniques. A controller 112 is coupled by communication links 114 to the base stations 116. The hardware of the controller 112 is, for example, a combination of the Wireless Messaging Gateway (WMG™) Administrator! communication terminal, and the RF-Conductor!™ message distributor manufactured by Motorola, Inc. The hardware of the base stations 116 is, for example, a combination of the Nucleus® Orchestra! transmitter and RF-Audience!™ receivers manufactured by Motorola, Inc. It will be appreciated that other similar hardware can be utilized for the controller 112 and the base stations 116. Each of the base stations 116 transmits RF signals via a transmitting antenna 120. The portable portion 104 comprises a plurality of first and second portable transceivers 122, 123.

The base stations 116 each receive RF signals from the plurality of first portable transceivers 122 via a receiving antenna 118. The RF signals transmitted between the base stations 116 to the first portable transceivers 122 comprise selective call messages (outbound messages) and response messages (inbound messages), which will be described below. An example of a detailed description of outbound and inbound acknowledge-back messaging is more fully described in U.S. Pat. No. 4,875,038 issued Oct. 17, 1989 to Siwiak et al.

The controller 112 is coupled by telephone links 101 to a public switched telephone network (PSTN) 110 for receiving selective call originations such as voice and data messages therefrom. Selective call originations are generated, for example, from a conventional telephone 111 coupled to the PSTN 110.

Figure 2:
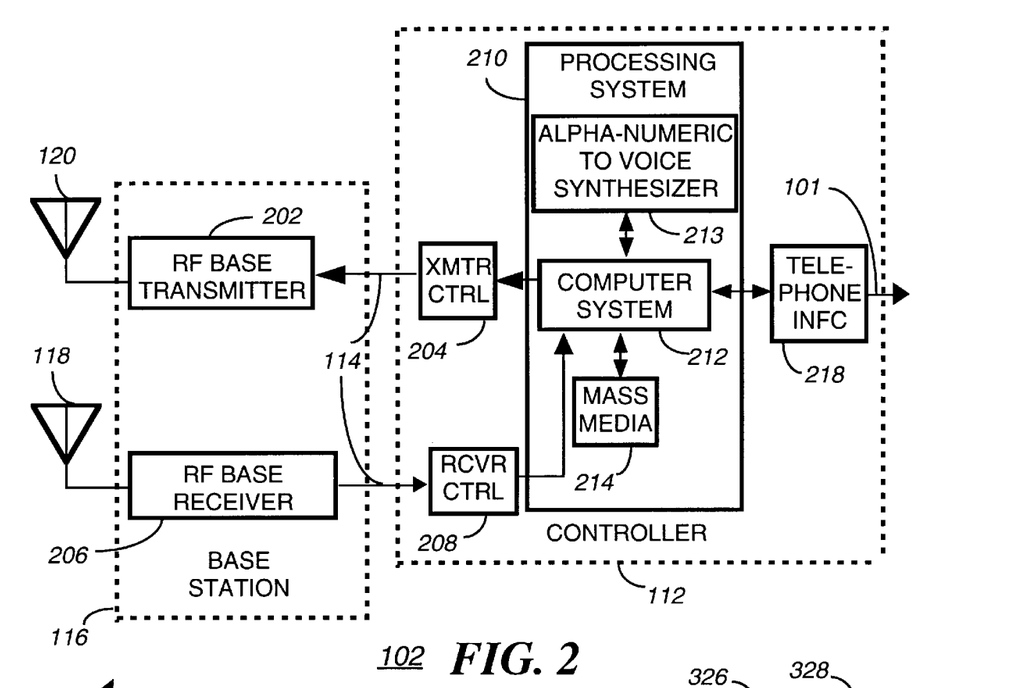
FIG. 2 is an electrical block diagram depicting elements of a communication terminal of the communication system.

FIG. 2 is an electrical block diagram of elements of the communication terminal 102 of the communication system. The communication terminal 102 comprises portions of the controller 112 and the base stations 116. The controller 112 includes a processing system 210 for directing operation of the controller 112. The processing system 210 is coupled through a transmitter controller 204 to a RF base transmitter 202 via the communication links 114. The communication links 114 can comprise, for example, a direct wire line (telephone) link, a data communication link, or any number of radio frequency links, such as a radio frequency (RF) transceiver link, a microwave transceiver link, or a satellite link.

The RF base transmitter 202 transmits a communication signal (in the form of, for example, two and four-level FSK data messages) to the first portable transceivers 122 during outbound messaging. The processing system 210 is also coupled to at least one RF base receiver 206 through a receiver controller 208 via the communication links 114. The RF base receiver 206 is for receiving inbound information (in the form of, for example, four-level FSK data messages) and is collocated with the base stations 116, as shown in FIG. 2, but alternatively is positioned remote from the base stations 116 to avoid interference from the RF base transmitter 202. The RF base receiver 206 receives one or more messages (ACKs, NAKs, or portable response messages) from the first portable transceivers 122.

The processing system 210 is also coupled to a telephone interface 218 for communicating with the PSTN 110 through the telephone links 101 for receiving selective call originations from a caller.

In order to perform the functions necessary in controlling the elements of the controller 112, as well as the elements of the base stations 116, the processing system 210 includes a computer system 212, mass storage media 214, and an alpha numeric-to-voice synthesizer 213. The mass storage media 214 is a memory device for storing subscriber user information such as, for example, first and second portable transceiver 122, 123 addressing, and programming options. The mass storage media 214 is a conventional hard disk mass storage device.

The computer system 212 is programmed by way of software included in the mass storage media 214. The computer system 212, for example, comprises a plurality of processors such as VME Sparc™ processors manufactured by Sun Microsystems, Inc. These processors include memory such as dynamic random access memory (DRAM), which serves as a temporary memory storage device for program execution, and scratch pad processing such as storing messages originated by callers using the PSTN 110, processing acknowledgments and portable response messages received from the first portable transceivers 122, and protocol processing of messages destined for the first portable transceivers 122. It will be appreciated that other types of conventional computer systems 212 can be utilized, and that additional computer systems 212 and mass storage media 214 of the same or alternative type can be added as required to handle the processing requirements of the processing system 210.

The alpha numeric-to-voice synthesizer 213 is a conventional text-to-voice synthesizer. It is utilized by the processing system 210 for translating a user created message received from the first portable transceiver 122 to a voice message, which is then delivered either to a phone number provided by the caller or to a second portable transceiver 123 designated by the caller.

Figure 3:
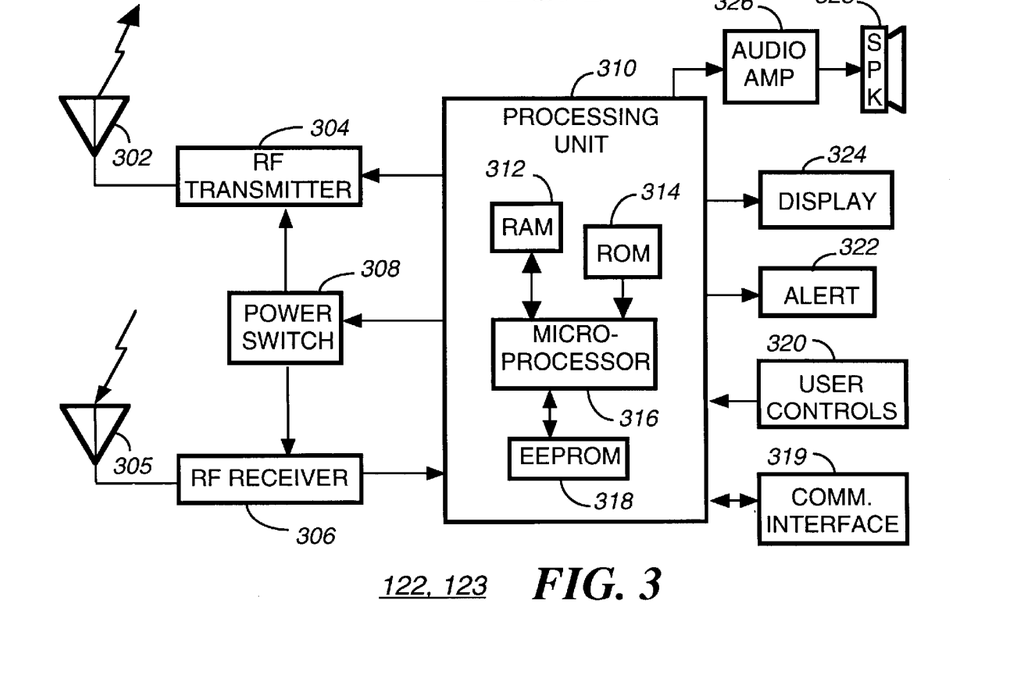
FIG. 3 is an electrical block diagram of a first portable transceiver.

FIG. 3 is an electrical block diagram depicting the first and second portable transceivers 122 and 123. Reference to FIG. 3 is made with respect to the first portable transceiver 122, it being understood that the second portable transceiver 123 is of similar structure. The first portable transceiver 122 comprises a transmitter antenna 302 for transmitting RF signals to the base stations 116, and a receiver antenna 305 for intercepting RF signals from the base stations 116. The transmitter antenna 302 is coupled to a conventional RF transmitter 304. Similarly, the receiver antenna 305 is coupled to a conventional RF receiver 306. The RF signals received from the base stations 116 are received as two and four-level FSK signals, for example. The RF signals transmitted by the first portable transceiver 122 to the base stations 116 are transmitted as four-level FSK signals, for example.

Radio signals received by the RF receiver 306 produce demodulated information at the output. The demodulated information is coupled to the input of a processing unit 310 for directing operations of the first portable transceiver 122, which processes outbound messages. Similarly, inbound acknowledgment messages and portable response messages are processed by the processing unit 310 and delivered to the RF transmitter 304 for transmission. A conventional power switch 308, coupled to the processing unit 310, controls the supply of power to the RF transmitter 304 and RF receiver 306, thereby providing a battery saving function.

To perform the necessary functions of the first portable transceiver 122, the processing unit 310 includes a microprocessor 316, a RAM 312, a ROM 314, and an EEPROM 318. Preferably, the microprocessor 316 is similar to the M68HC08 micro-controller manufactured by Motorola, Inc. It will be appreciated that other similar processors can be utilized for the microprocessor 316, and that additional processors of the same or alternative type can be added as required to handle the processing requirements of the processing unit 310. It will also be appreciated that other types of memory, e.g., EEPROM or FLASH, can be utilized for the ROM 314, as well as the RAM 312. It will be further appreciated that the RAM 312 and the ROM 314, singly or in combination, can be an integral portion of the microprocessor 316.

The microprocessor 316 is programmed by way of the ROM 314 to process incoming messages on the outbound channel, and for creating acknowledgment messages on the inbound channel. During outbound message processing, the microprocessor 316 samples the demodulated signal generated by the RF receiver 306. The microprocessor 316 then decodes an address in the demodulated data of the outbound message, compares the decoded address with one or more addresses stored in the EEPROM 318, and when a match is detected, the microprocessor 316 proceeds to process the remaining portion of the message.

Once the microprocessor 316 has processed the message, it stores the message in the RAM 312, and a call alerting signal is generated to alert a user that a message has been received. The call alerting signal is directed to a conventional audible or tactile alerting device 322 for generating an audible or tactile call alerting signal. In addition, the microprocessor 316 is programmed to send response messages to the base stations 116. To send a response message, the microprocessor 316 controls the modulation circuit (not shown) of the RF transmitter 304 to transmit the FSK data corresponding to the response message.

Received outbound messages are accessed by the user through user controls 320, which provide functions such as lock, unlock, delete, read, etc. More specifically, by the use of appropriate functions provided by the user controls 320, the message is recovered from the RAM 312, and displayed on a display 324, e.g., a conventional liquid crystal display (LCD), or announced audibly, in the case of a voice message, by the audio amplifier 326 and speaker 328.

The processing unit 310 is further coupled to a communication interface 319 for communicating with external devices. The external devices include, for instance, a conventional computer. The communication interface 319 can be, for example, implemented with an conventional infra-red serial communicator. Alternatively, the communication interface 319 can be a conventional microphone with associated circuits (e.g., analog-to-digital-converter and low-pass filter) to record a voice message into the first portable transceiver 122. The purpose of this interface is to provide the user of the first portable transceiver 122 with a means for programming a user created message into the memory (e.g., RAM 312) of the first portable transceiver 122. The user can, alternatively, program the user created message by functions provided by the user controls 320.

Figure 4:
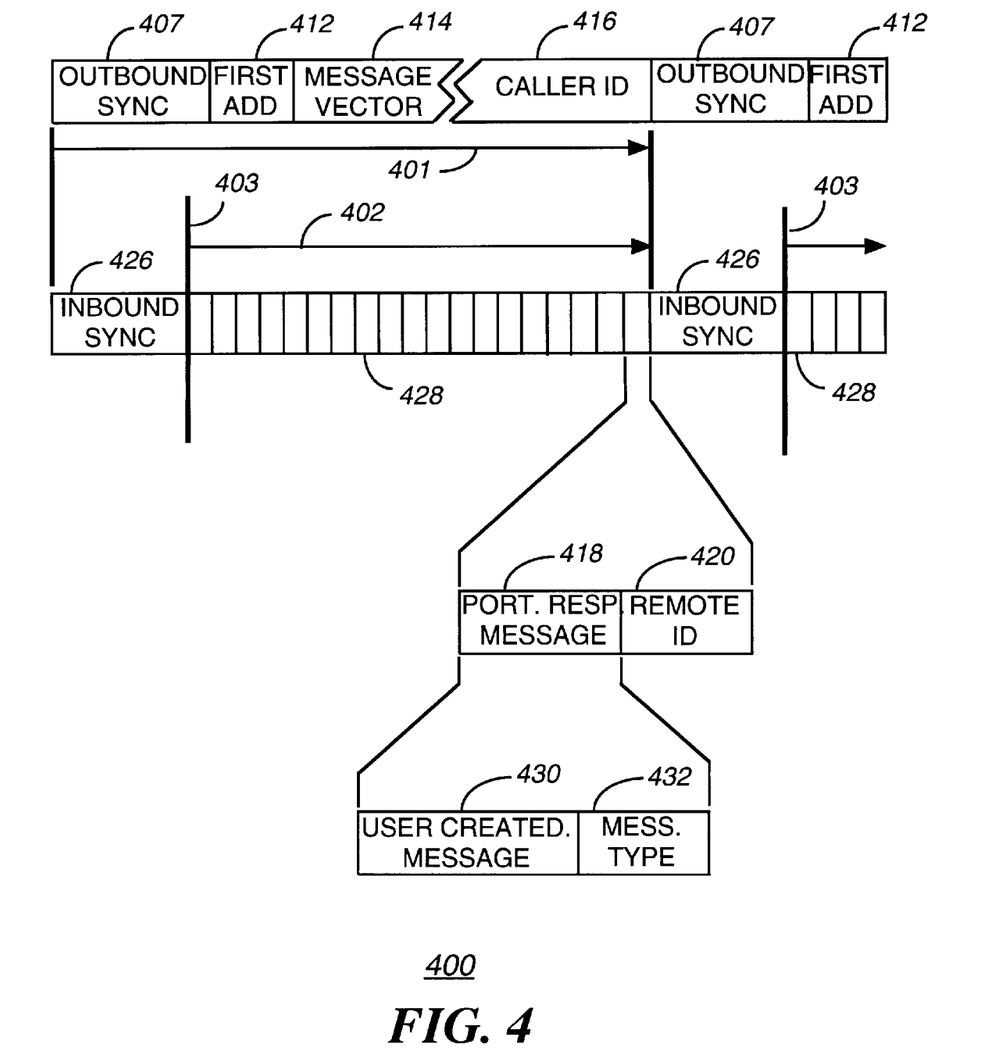
FIG. 4 is a timing diagram illustrating elements of an outbound protocol and an inbound protocol between the communication terminal and the first portable transceiver.

FIG. 4 is a timing diagram 400 of elements of an outbound protocol (from communication terminal 102 to first portable transceiver 122) and an inbound protocol (from portable transceiver 122 to communication terminal 102) of the communication system. The outbound and inbound messages are similar to Motorola's well-known ReFLEX™ digital selective call signaling protocol. This protocol utilizes well-known error detection and error correction techniques and is therefore tolerant to bit errors occurring during transmission, provided that the bit errors are not too numerous in any one code word.

The signaling format of the outbound and inbound channels operates on independent frequencies utilizing conventional frequency division multiplexing (FDM). With FDM transmission, both outbound and inbound RF channel transmissions are depicted during a time interval 401. The elements of the outbound protocol are an outbound sync 407, a first address 412, a message vector 414 and a caller identifier 416. The outbound sync 407 provides the first portable transceiver 122 a means for synchronization utilizing techniques well known in the art. The first address 412 identifies the first portable transceiver 122 for which the outbound message is intended to be decoded. The message vector 414 points in time within the signal format to the position of the caller identifier 416 to be received by the first portable transceiver 122. The message vector 414 further provides information to the first portable transceiver 122 identifying a scheduled time slot for acknowledging the message transaction.

The elements of the inbound protocol comprise an inbound sync 426, and scheduled time slots 428. The inbound sync 426 provides the base stations 116 a means for synchronization utilizing techniques well known in the art. Scheduled messages commence after the inbound sync 426 at time boundary 403. A transmission time interval 402 depicts the time interval for scheduled transmissions on scheduled time slots 428 from the first portable transceivers 122.

Scheduled inbound messages preferably comprise a portable response message 418, and a remote identifier 420. The remote identifier 420 is, for example, the address of the first portable transceiver 122 included in the EEPROM 318. The portable response message 418 includes a user created message 430, and a message type 432. The user created message 430 is a message created by the user of the first portable transceiver 122. The message type 432 identifies the message as either an alpha numeric message or a voice message.

Figure 5:
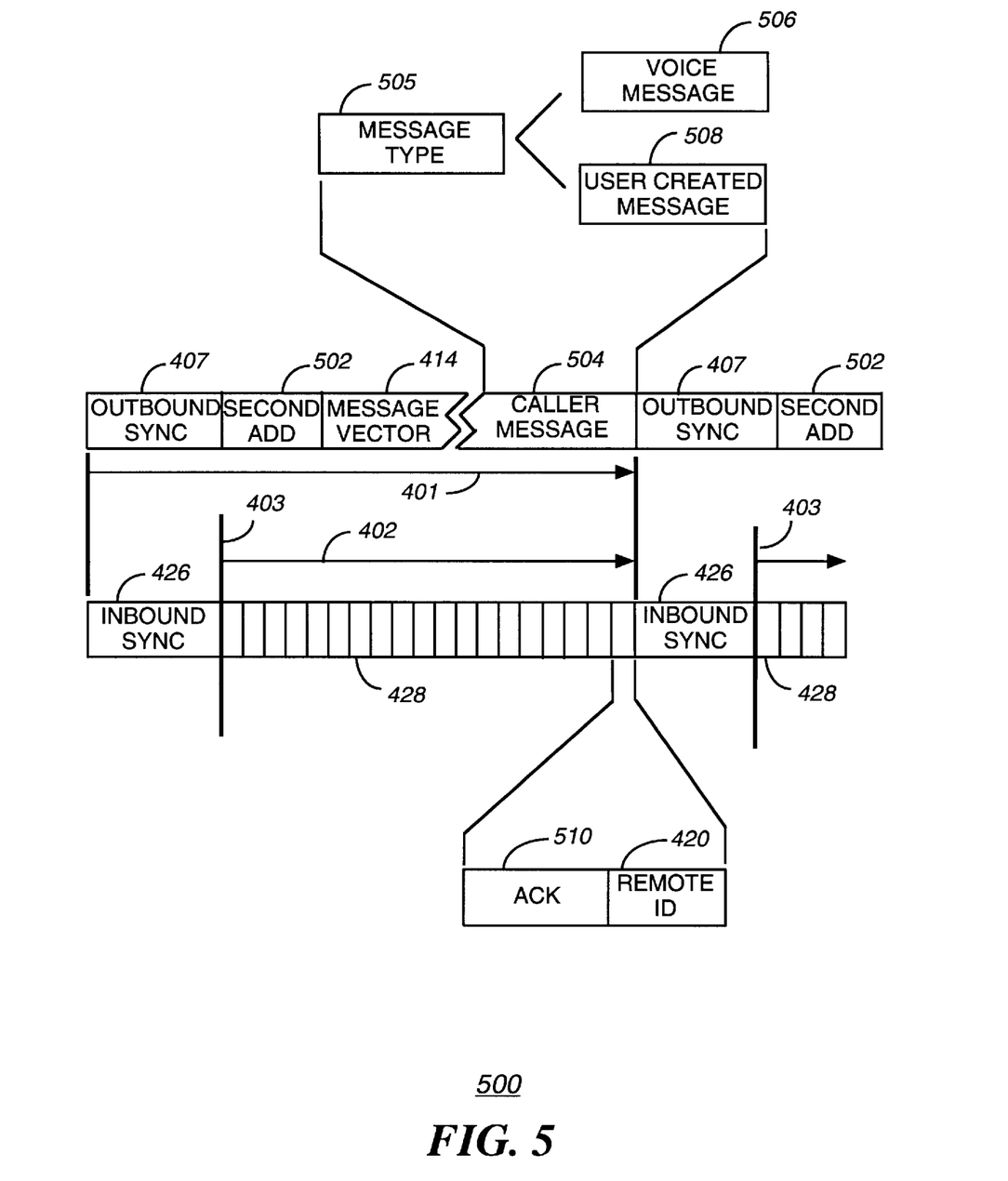
FIG. 5 is a timing diagram illustrating elements of an outbound protocol and an inbound protocol between the communication terminal and the second portable transceiver.

FIG. 5 is a timing diagram 500 of elements of an outbound protocol and an inbound protocol of the communication terminal 102 and second portable transceiver 123 of the communication system. This protocol is utilized by the communication system to transmit a caller response message to the second portable transceiver 123 in response to retrieving the user created message from the first portable transceiver 122. The protocol has the same elements as described in FIG. 4 except that the first address 412 is replaced with a second address 502, the caller identifier 416 is replaced with a caller message 504, and the portable response message 418 is replaced with an acknowledgment message 510. The second address 502 is utilized by the second portable transceiver 123 to decode a caller response message intended for the second portable transceiver 123.

The caller message 504 included in the caller response message comprises a message type 505, and either a voice message 506 or a user created message 508. The message type is used by the second portable transceiver 123 to determine whether the caller message 504 is either a voice message or an alpha numeric message. The user created message 508 is an unadulterated form of the message created by the user of the first portable transceiver 122. The voice message 506 is a message most likely created from the translation of a user created message 506 to a voice message 506 by way of the alpha numeric-to-voice synthesizer 213 of the controller 112. The acknowledgment message 510 is sent to the base stations 116 to acknowledge a valid reception of the caller response message transmitted by the communication terminal 102.

Figure 6:
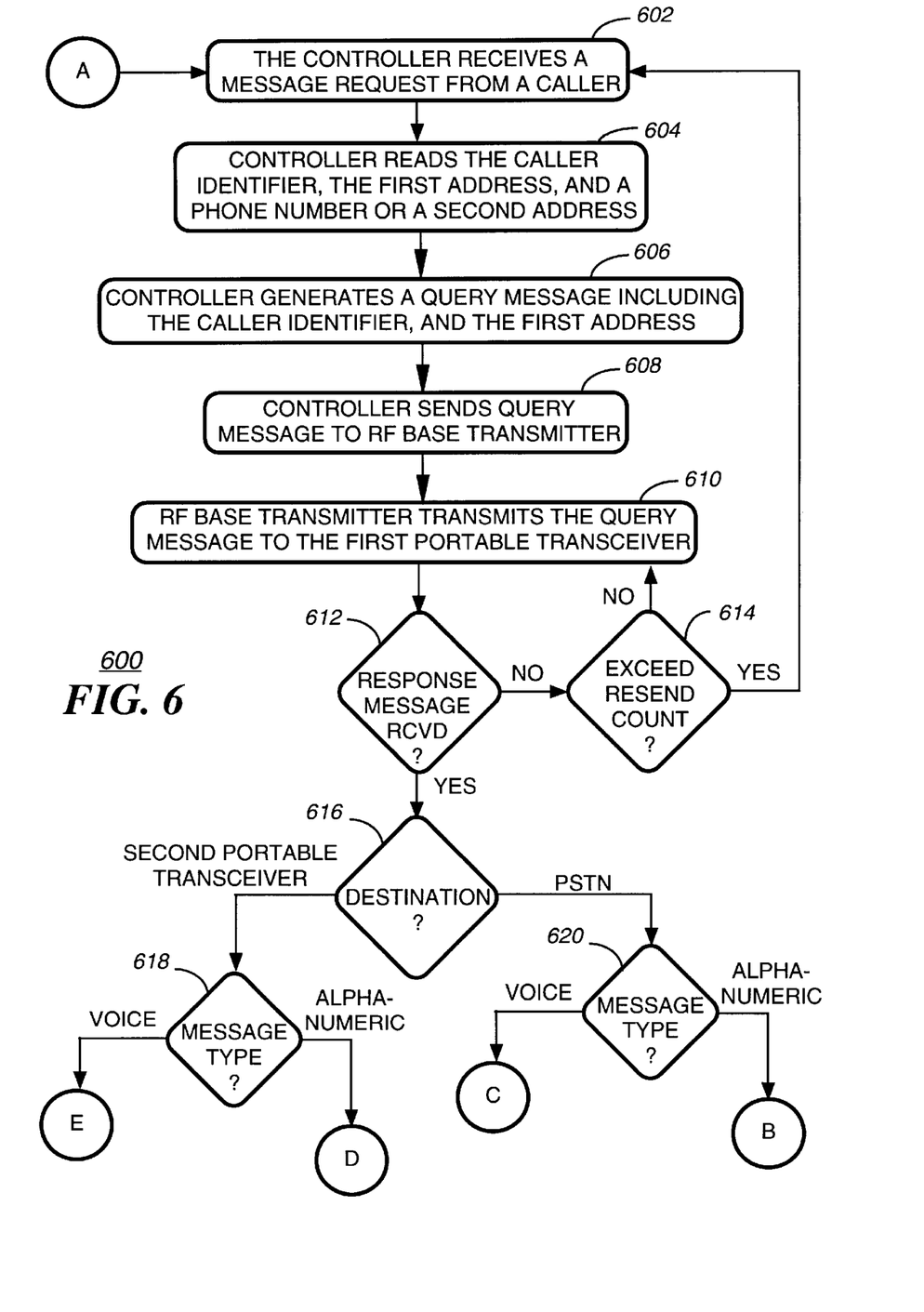
FIGS. 6, 7, and 8 are flow charts depicting operation of the communication terminal of the communication system.
Figure 7:
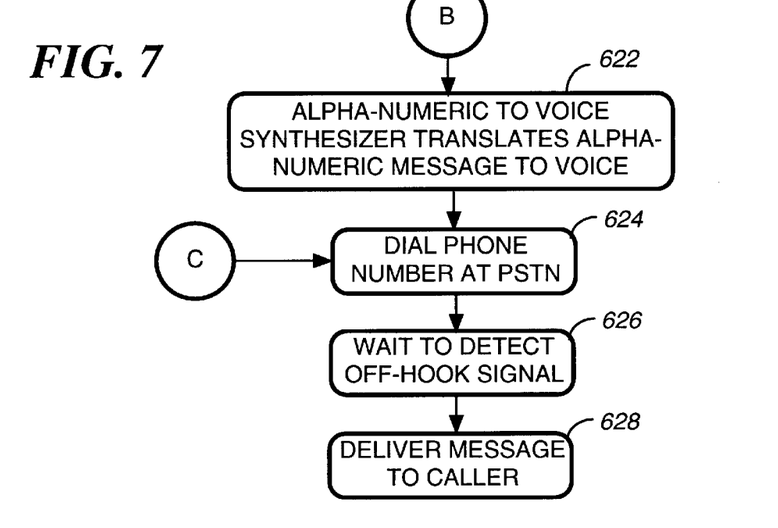

FIGS. 6 and 7 are flow charts 600 depicting operation of the communication terminal 102 of the communication system. The flow chart 600 begins with step 602 where the controller receives a message request from a caller through the PSTN 110. The message request includes in one embodiment the caller identifier 416, the first address 412, and a phone number of the caller. In an alternative embodiment, the phone number is replaced with the second address 502 corresponding to the second portable transceiver 123. In step 604, depending on the embodiment, these parameters are read by the controller 112. In step 606 the controller 112 generates a query message including the caller identifier 416, and the first address 412. The controller 112 then sends the query message to the RF base transmitter 202 via the transmitter controller 204 in step 608. In step 610, the RF base transmitter transmits the query message to the first portable transceiver 122.

The controller 112, in step 612, then waits for a response message from the first portable transceiver 122, which includes the portable response message 418, and the remote identifier 420. If the response message has not been received, then the controller 112 proceeds to step 614 where retransmission count is checked. If the number of retransmissions to the first portable transceiver 122 does not exceed a predetermined threshold (e.g., three retries), then the controller proceeds to step 610 where the query message is retransmitted; otherwise, the controller 112 proceeds to step 602 where it processes new messages from callers.

Figure 8:
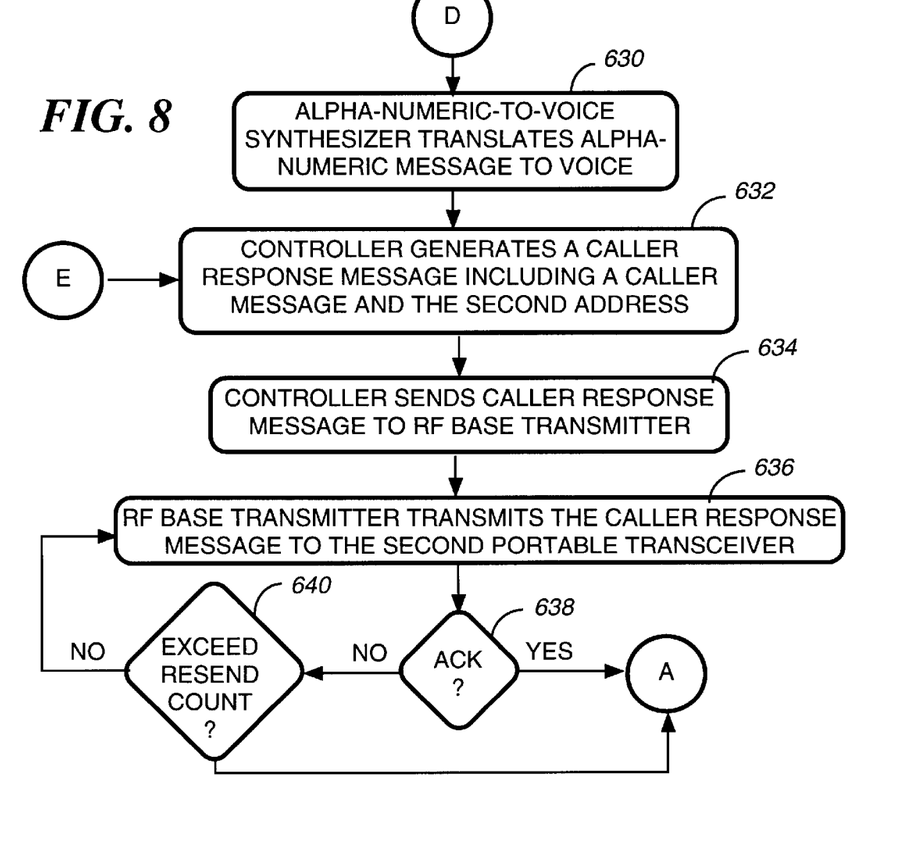

Once the response message is received, the controller 112 proceeds to step 616 where it checks for the destination of the portable response message 418. In the embodiment where a phone number is provided by the caller, the controller 112 proceeds to step 620. In the alternative embodiment where the caller provides a second address 502 corresponding to the second portable transceiver 123, the controller 112 proceeds to step 618. In step 620 the controller 112 checks the message type 432 included in the portable response message 418. If the user created message 430 included in the portable response message 418 is a voice message, then the controller proceeds to step 624 of FIG. 7. If the user created message 430 is an alpha numeric message, then the controller 112 proceeds to step 622.

Similarly, in step 618 the controller 112 checks the message type 432 received. If the user created message 430 is a voice message, then the controller proceeds to step 632 of FIG. 8. If the user created message 430 is an alpha numeric message, then the controller 112 proceeds to step 630.

When the user created message is alpha numeric, and it is destined for the phone number provided by the caller, the controller 112 first processes the message in step 622 by activating the alpha numeric-to-voice synthesizer 213 for translating the text message into a synthesized voice message. The controller 112 then in step 624 dials the phone number at the PSTN 110 provided by the caller. In step 626 the controller 112 waits for an off-hook signal from the PSTN 110. When detected the controller 112 delivers the synthesized voice message to the caller in step 628. When the user created message is received from the first portable transceiver 122 as a voice message, step 622 is bypassed, and the other steps described above are performed.

When the destination of the portable response message, however, is for the second portable transceiver 123, and the user created message is an alpha numeric message, the controller 112 activates the alpha numeric-to-voice synthesizer 213 to translate the message to a synthetic voice message 506. In step 632, the controller 112 then generates a caller response message which includes a caller message 504, and the second address 502. In step 634, the controller 112 sends the caller response message to the RF base transmitter 202 by way of the transmitter controller 204. In response, the RF base transmitter 202 in step 636 transmits the caller response message to the second portable transceiver 123. In one embodiment the caller response message is transmitted digitally (e.g., four-level frequency shift keyed—FSK). In an alternative embodiment, the synthetic voice message included in the caller response message can be transmitted in an analog communication format (e.g., single side band amplitude modulation).

In step 638 the controller 112 waits for an acknowledgment message from the second portable transceiver 123 confirming the caller response message was received. If the message was received, then the controller 112 proceeds to step 602 awaiting new message requests from other callers. If the acknowledgment is not received, then the controller 112 proceeds to step 640, where it checks if the number of retransmissions has exceeded a predetermined threshold. If it has not, then the controller 112 performs step 636 where the caller response message is retransmitted. If the number of retransmissions has been exceeded, then the controller 112 abandons communication with the second portable transceiver 123 by proceeding to step 602. Returning to step 618, when the original user created message is a voice message, then the controller 112 bypasses step 630 and proceeds to step 632 and performs the other steps described above.

It will be appreciated that, alternatively, the controller 112 can be programmed to not alter any messages received from the first portable transceiver 122. In this embodiment, the controller 112 proceeds directly to step 632 and follows the proceeding steps described above.

Figure 9:
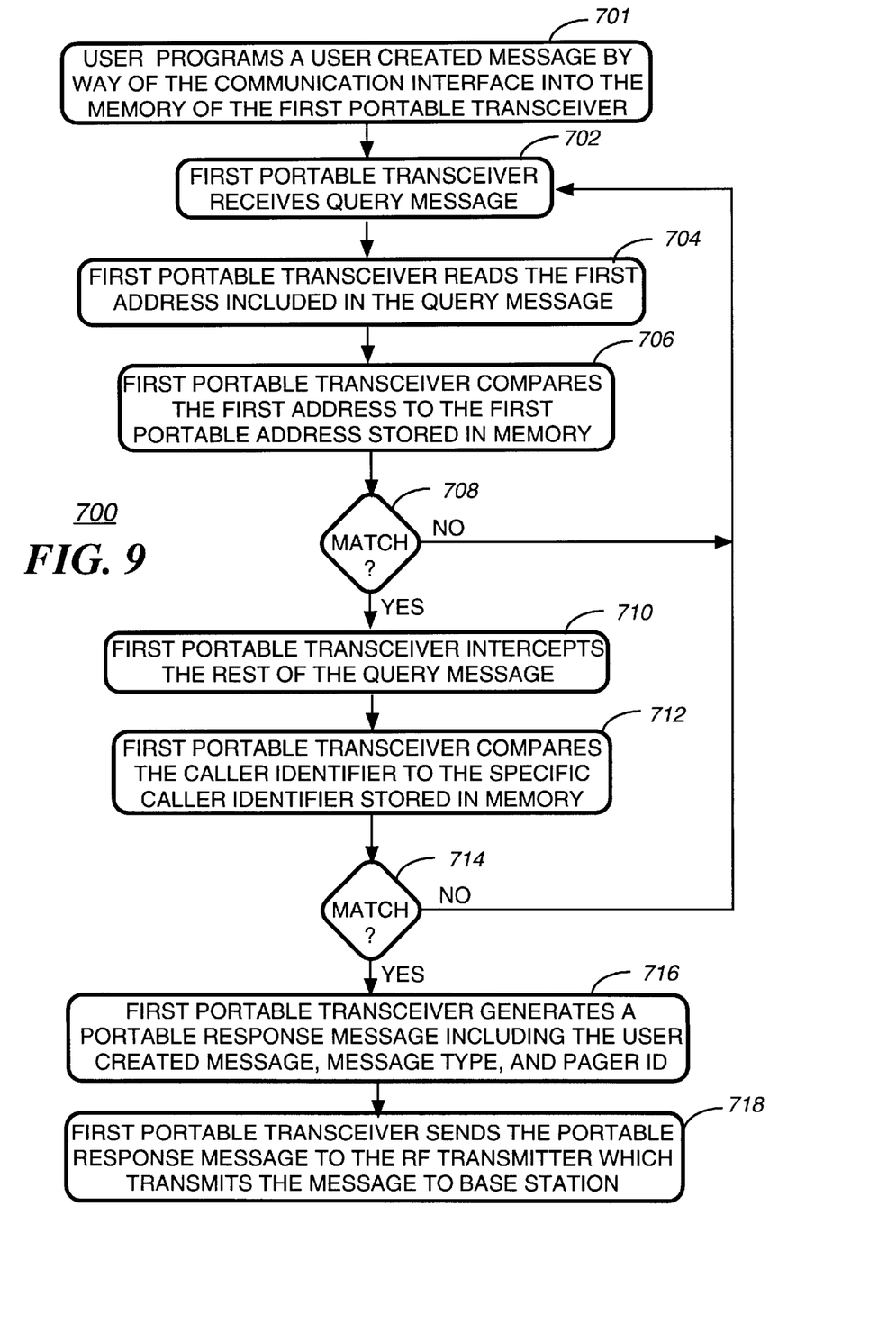
FIGS. 9 and 10 are flow charts depicting operation of the first and second portable transceivers, respectively.

FIG. 9 is a flow chart 700 depicting operation of the first portable transceiver 122. The flow chart 700 proceeds with step 701 where the user of the first portable transceiver 122 programs the user created message into the RAM 312 of the processing unit 310 by way of the communication interface 319. The user may, for example, create the user created message with a conventional computer system, and then download the message through the communication interface 319 of the first portable transceiver 122. Alternatively, the user can also create the user created message by functions provided by the user controls 320, or in the case of a microphone interface, record a voice message into the first portable transceiver 122.

In step 702 the first portable transceiver 122 receives the query message transmitted by the controller 112. In step 704 the first portable transceiver 122 reads the first address 412 included in the query message. The first portable transceiver 122 then compares the first address 412 with a first portable identifier stored in the EEPROM 318 of the processing unit 310 in step 706. The first portable identifier is an address used by the first portable transceiver 122 to identify when an intercepted message is destined for the first portable transceiver 122. If the first address 412 and the first portable identifier match in step 708, then the first portable transceiver 122 proceeds to step 710; otherwise, the first portable transceiver 122 ignores the intercepted message and proceeds to step 702 awaiting new query messages.

In response to receiving a matching address, in step 710, the first portable transceiver 122 intercepts the rest of the query message. The first portable transceiver 122, then compares the caller identifier 416 included in the query message with a specific caller identifier programmed into the RAM 312. The specific caller identifier is an identifier corresponding to the user created message stored in the RAM 312. The specific caller identifier is programmed automatically by the processing unit 310 in the RAM 312 when the user creates and stores the user created message in the RAM 312. The specific caller identifier is utilized by the first portable transceiver 122 in step 712 to determine if the query message corresponds to a stored user created message in the RAM 312 by comparing the caller identifier with the specific caller identifier. If no match is detected in step 714, then the first portable transceiver 122 discards the query message and proceeds to step 702. If a match is detected, then the first portable transceiver 122 proceeds to step 716.

At step 716, the first portable transceiver 122 generates a portable response message 418 which includes the user created message 430, and the message type 432 corresponding to the user created message 430. In step 718 the first portable transceiver sends the portable response message 418 and remote identifier 420 to the RF transmitter, which transmits the message to the base stations 116.

Figure 10:
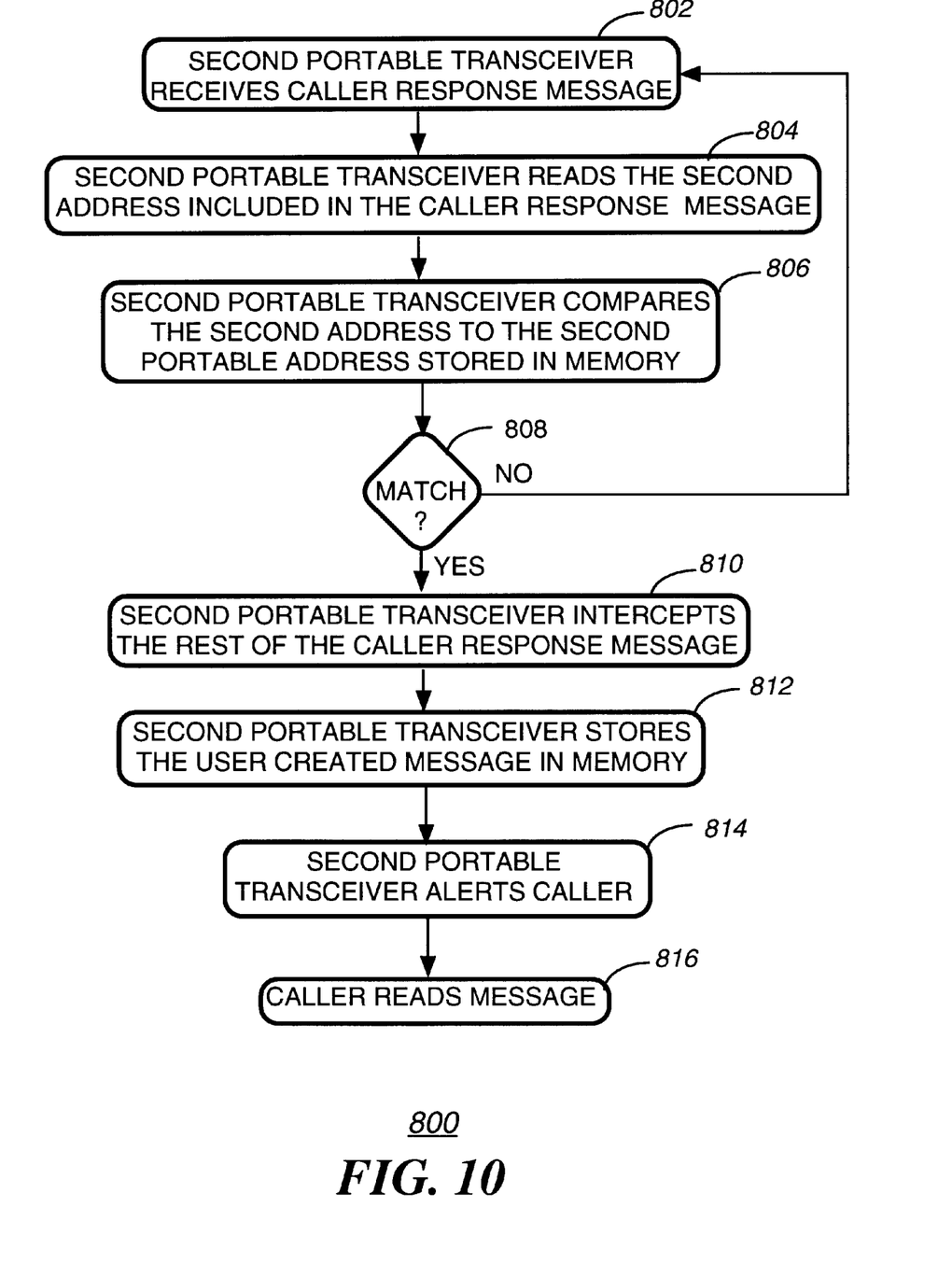

FIG. 10 is a flow chart 800 depicting operation of the second portable transceiver 123. The flow chart 800 begins with step 802 where the second portable transceiver 123 receives the caller response message transmitted by the communication terminal 102. In step 804 the second portable transceiver 123 reads the second address 502 included in the caller response message. In step 806 the second portable transceiver 123 then compares the second address 502 with a second portable identifier stored in the EEPROM 318 of the second portable transceiver 123. The second portable identifier is used for identifying caller response messages intended to be intercepted by the second portable transceiver 123. If in step 808 no match is detected, then the second portable transceiver 123 proceeds to step 802 where it awaits new messages.

If a match is detected, then the second portable transceiver 123 proceeds to step 810 where the rest of the caller response message is intercepted by the second portable transceiver 123. In step 812 the caller message 504 received in the caller response message is stored in the RAM 312 of the second portable transceiver 123. In response to storing the message, in step 814 the second portable transceiver 123 triggers the alerting device 322 to alert the user that a message has been received. In step 816 the user uses the appropriate functions in the user controls 320 to read the message. If the message type 505 identifies the message as a voice message, then the user will hear the voice message played out on the audio speaker 328 of the second portable transceiver 123. If the message type 505 identifies the message as an alpha numeric message, then the user will read the message in the display 324 of the second portable transceiver 123.

Thus, it should be apparent that the present invention provides an apparatus for communicating a user created message from a portable transceiver to a caller. In particular, the apparatus advantageously provides a method by which a user created message for a caller can be retrieved in response to a query message sent via the communication terminal 102 by the caller. In addition, the caller can request for the user created message to be delivered to one of several destinations, for example, a phone number or a second portable transceiver 123. Furthermore, in cases where the user created message is an alpha numeric message, the communication terminal 102 provides an apparatus for translating the alpha numeric message to a voice message before delivering the message to the caller.

What is claimed is:

1. A method for communicating a user created message from a first portable transceiver to a caller, comprising the steps of:

storing the user created message in the first portable transceiver;

storing a specific caller identifier corresponding to the user created message in the first portable transceiver;

receiving at a communication terminal a message request from the caller, the message request including a caller identifier and a first address;

transmitting from the communication terminal a communication signal, the communication signal including a query message wherein the query message further includes the first address and the caller identifier, receiving at the first portable transceiver the communication signal including the query message seeking retrieval of the user created message, said receiving further including processing the communication signal in its entirety when there is a match between a portion of the communication signal including the first address, and a first portable identifier stored in the first portable transceiver;

comparing the caller identifier in the query message with the specific caller identifier;

transmitting from the first portable transceiver the user created message to the communication terminal when there is a match between the caller identifier in the query message and the specific caller identifier receiving at the communication terminal from the first portable transceiver the user created message, and wherein the message request further includes a second address corresponding to a second portable transceiver;

transmitting from the communication terminal a caller response message including the user created message and the second address;

receiving at the second portable transceiver the caller response message;

comparing the second address received in the caller response message with a second portable identifier stored in the second portable transceiver; and storing the user created message in the second portable transceiver when there is a match between the second address and the second portable identifier.

2. The method of claim 1, further comprising the step of the user of the first portable transceiver creating the user created message and storing the user created message in the first portable transceiver.

3. A method for communicating a user created message from a first portable transceiver to a caller, comprising the steps of:

storing the user created message in the first portable transceiver;

storing a specific caller identifier corresponding to the user created message in the first portable transceiver;

receiving at a communication terminal a message request from the caller, the message request including a caller identifier and a first address;

transmitting from the communication terminal a communication signal, the communication signal including a query message wherein the query message further includes the first address and the caller identifier, receiving at the first portable transceiver the communication signal including the query message seeking retrieval of the user created message, said receiving further including processing the communication signal in its entirety when there is a match between a portion of the communication signal including the first address, and a first portable identifier stored in the first portable transceiver;

comparing the caller identifier in the query message with the specific caller identifier;

transmitting from the first portable transceiver the user created message to the communication terminal when there is a match between the caller identifier in the query message and the specific caller identifier receiving at the communication terminal from the first portable transceiver the user created message, the user created message including an alpha numeric message, and wherein the message request further includes a phone number;

synthesizing the alpha numeric message into a voice message;

dialing the phone number at a public switched telephone network (PSTN);

detecting an off-hook signal from the PSTN; and transmitting the voice message to the caller.

4. A communication system for communicating a user created message from a first portable transceiver to a caller, the communication system comprising:

a communication terminal comprising:
  a processing system for directing operation of the communication terminal;
  an interface coupled to the processing system for receiving a message request from the caller;
  a radio frequency (RF) base transmitter coupled to the processing system for transmitting a query message to the first portable transceiver, the query message including a caller identifier corresponding to the caller;
  a RF base receiver coupled to the processing system for receiving signals from the first portable transceiver; and the first portable transceiver comprising:
  a processing unit for directing operation of the first portable transceiver;
  a RF receiver coupled to the processing unit for receiving the query message from the communication terminal;
  a RF transmitter coupled to the processing unit for transmitting a portable response message, the portable response message including the user created message;
  a memory coupled to the processing unit for storing the user created message and a specific caller identifier corresponding to the user created message; and
  wherein the processing unit is programmed for controlling the RF transmitter to transmit to the communication terminal the portable response message including the user created message to the caller when there is a match between the caller identifier included in the query message and the specific caller identifier a second portable transceiver comprising:
  a processing unit for directing operation of the second portable transceiver;
  a RF receiver coupled to the processing unit for receiving a caller response message from the communication terminal;
  a RF transmitter coupled to the processing unit for transmitting an acknowledgment message confirming valid reception of the caller response message; and
  a memory coupled to the processing unit for storing the caller response message and a second portable identifier corresponding to the caller response message, and wherein the processing unit is programmed for controlling the RF transmitter to transmit to the communication terminal the acknowledgment message when there is a match between a second address included in the caller response message and the second portable identifier.

5. The communication system of claim 4,
wherein the query message further includes a first address, and
wherein the processing system of the communication terminal is further programmed for:
controlling the interface for receiving a message request from the caller, the message request including the caller identifier and the first address; and
controlling the RF base transmitter for transmitting from the communication terminal a communication signal, the communication signal including the query message.

6. The communication system of claim 5, wherein the processing unit of the first portable transceiver is further programmed for directing the operation of the first portable transceiver to process the communication signal in its entirety when there is a match between a portion of the communication signal including the first address, and a first portable identifier stored in the memory of the first portable transceiver.

7. The communication system of claim 6,
wherein the message request further includes the second address corresponding to the second portable transceiver, and
wherein the processing system of the communication terminal is further programmed for:
receiving from the RF base receiver the portable response message including the user created message transmitted by the portable transceiver;
transmitting from the RF base transmitter the caller response message including the user created message and the second address;
wherein the processing unit of the second portable transceiver is further programmed for:
directing operation of the RF receiver to intercept the caller response message;
comparing the second address received with the caller response message with the second portable identifier;
storing the user message received with the caller response message in the memory; and
altering a user of the second portable transceiver that the user created message has been received.

8. The communication system of claim 7, wherein the interface is a telephone interface for communicating with a public switched telephone network (PSTN).

9. The communication system of claim 8,
wherein the message request further includes a phone number, and wherein the communication terminal further includes an alpha numeric-to-voice synthesizer, and
wherein the processing system of the communication terminal is further programmed for:
receiving from the RF base receiver the user created message, wherein the user created message is an alpha numeric message; and
controlling the alpha numeric-to-voice synthesizer for synthesizing the alpha numeric message into a voice message.

10. The communication system of claim 9, wherein the processing system of the communication terminal is further programmed for controlling the telephone interface for dialing the phone number at the PSTN, detecting an off-hook signal from the PSTN, and for delivering the voice message to the caller.

11. The communication system of claim 9,
wherein the message request further includes the second address corresponding to the second portable transceiver, and
wherein the processing system of the communication terminal is further programmed for:
receiving from the RF base receiver the user created message, wherein the user created message is an alpha numeric message;
controlling the alpha numeric-to-voice synthesizer for synthesizing the alpha numeric message into a voice message;
transmitting from the RF base transmitter the caller response message including the voice message and the second address;
wherein the processing unit of the second portable transceiver is further programmed for:
directing operation of the RF receiver to intercept the caller response message;
comparing the second address received with the caller response message with the second portable identifier;
storing the voice message received with the caller response message in the memory; and
altering a user of the second portable transceiver that the voice message has been received.

12. A portable transceiver comprising:
a processing unit for directing operation of the portable transceiver;
a memory coupled to the processing unit for storing a specific caller identifier corresponding to a user created message entered by a user;
a radio frequency (RF) receiver coupled to the processing unit for receiving a query message from a communication terminal, the query message including a caller identifier and seeking retrieval of the user created message; and
a RF transmitter coupled to the processing unit for transmitting the user created message, and
wherein the processing unit is programmed for controlling the RF transmitter to transmit the user created message to the communication terminal when there is a match between the caller identifier received in the query message and the specific caller identifier and
wherein the processing unit is further programmed for controlling the RF transmitter to transmit a message request including a portable identifier corresponding to said portable transceiver, a second caller identifier, and a second portable identifier to said communications terminal and for controlling said radio frequency receiver to further receive a response message corresponding to said message request from said communications terminal when said caller identifier matched a second specific caller identifier stored at a second portable transceiver.

13. The communication system of claim 12, wherein the first portable transceiver further includes a communication interface for receiving the user created message.

* * * * *